(12) United States Patent
Hulsken et al.

(10) Patent No.: US 10,365,468 B2
(45) Date of Patent: *Jul. 30, 2019

(54) AUTOFOCUS IMAGING

(71) Applicant: KONINKLIJKE PHILIPS N.V., Eindhoven (NL)

(72) Inventors: Bas Hulsken, Noord Branbant (NL); Sjoerd Stallinga, Delfgauw (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/922,988

(22) Filed: Mar. 16, 2018

(65) Prior Publication Data
US 2018/0203220 A1    Jul. 19, 2018

Related U.S. Application Data

(62) Division of application No. 13/697,681, filed as application No. PCT/IB2011/051963 on May 4, 2011, now Pat. No. 10,061,108.

(30) Foreign Application Priority Data

May 18, 2010 (EP) .................................... 10305520
May 27, 2010 (EP) .................................... 10305559

(51) Int. Cl.
*H04N 5/225* (2006.01)
*H04N 3/14* (2006.01)
*G02B 21/24* (2006.01)
*G02B 21/36* (2006.01)
*H04N 5/232* (2006.01)

(52) U.S. Cl.
CPC .......... *G02B 21/245* (2013.01); *G02B 21/36* (2013.01); *H04N 3/1581* (2013.01); *H04N 5/2258* (2013.01); *H04N 5/23212* (2013.01)

(58) Field of Classification Search
None
See application file for complete search history.

(56) References Cited

U.S. PATENT DOCUMENTS

| 3,883,689 A | 5/1975 | Mansour et al. |
| 6,078,681 A | 6/2000 | Silver |
| 6,088,083 A | 7/2000 | Meier |
| 6,711,283 B1 | 3/2004 | Soenksen |
| 6,917,696 B2 | 7/2005 | Soenksen |

(Continued)

FOREIGN PATENT DOCUMENTS

| EP | 20090306350 | 12/2009 |
| JP | H02136845 A | 5/1990 |

(Continued)

*Primary Examiner* — Roberto Velez
*Assistant Examiner* — Quan Pham

(57) ABSTRACT

The present invention relates to the field of digital pathology and in particular to whole slide scanners. Autofocus imaging can be performed by sampling a first number of pixels of an image sensor and sampling a second number of pixels of the image sensor, wherein the second number is between one quarter and three quarters of the first number. Thus, continuous autofocus for rapid light scanning may be provided using data from a single sensor based on sampling data along a tilt with respect to the optical axis.

16 Claims, 4 Drawing Sheets

(56) References Cited

U.S. PATENT DOCUMENTS

| | | | |
|---|---|---|---|
| 7,473,877 B2* | 1/2009 | Fomitchov | G02B 7/36 |
| | | | 250/201.2 |
| 7,586,688 B2* | 9/2009 | Wiederhoft | G02B 21/0008 |
| | | | 359/369 |
| 10,061,108 B2* | 8/2018 | Hulsken | G02B 21/245 |
| 2003/0016301 A1* | 1/2003 | Aizaki | G02B 21/365 |
| | | | 348/345 |
| 2004/0223632 A1 | 11/2004 | Olszak | |
| 2005/0037066 A1 | 2/2005 | Udell | |
| 2005/0258335 A1 | 11/2005 | Oshiro et al. | |
| 2005/0270611 A1 | 12/2005 | Oshiro | |
| 2008/0266652 A1 | 10/2008 | Yazdanfar | |
| 2009/0073553 A1 | 3/2009 | Hirata | |
| 2009/0224151 A1 | 9/2009 | Hatakeyama et al. | |
| 2009/0231689 A1 | 9/2009 | Pittsyn | |
| 2009/0289169 A1 | 11/2009 | Yang et al. | |
| 2010/0033811 A1 | 2/2010 | Westphal et al. | |
| 2010/0220217 A1 | 9/2010 | Yuyama | |
| 2012/0287256 A1 | 11/2012 | Hulsken et al. | |
| 2018/0210182 A1* | 7/2018 | Hulsken | G02B 21/245 |

FOREIGN PATENT DOCUMENTS

| | | |
|---|---|---|
| JP | 60026311 A | 2/1995 |
| JP | 08106040 A | 4/1996 |
| WO | 2005010495 A2 | 2/2005 |
| WO | 2005114293 A1 | 12/2005 |

\* cited by examiner

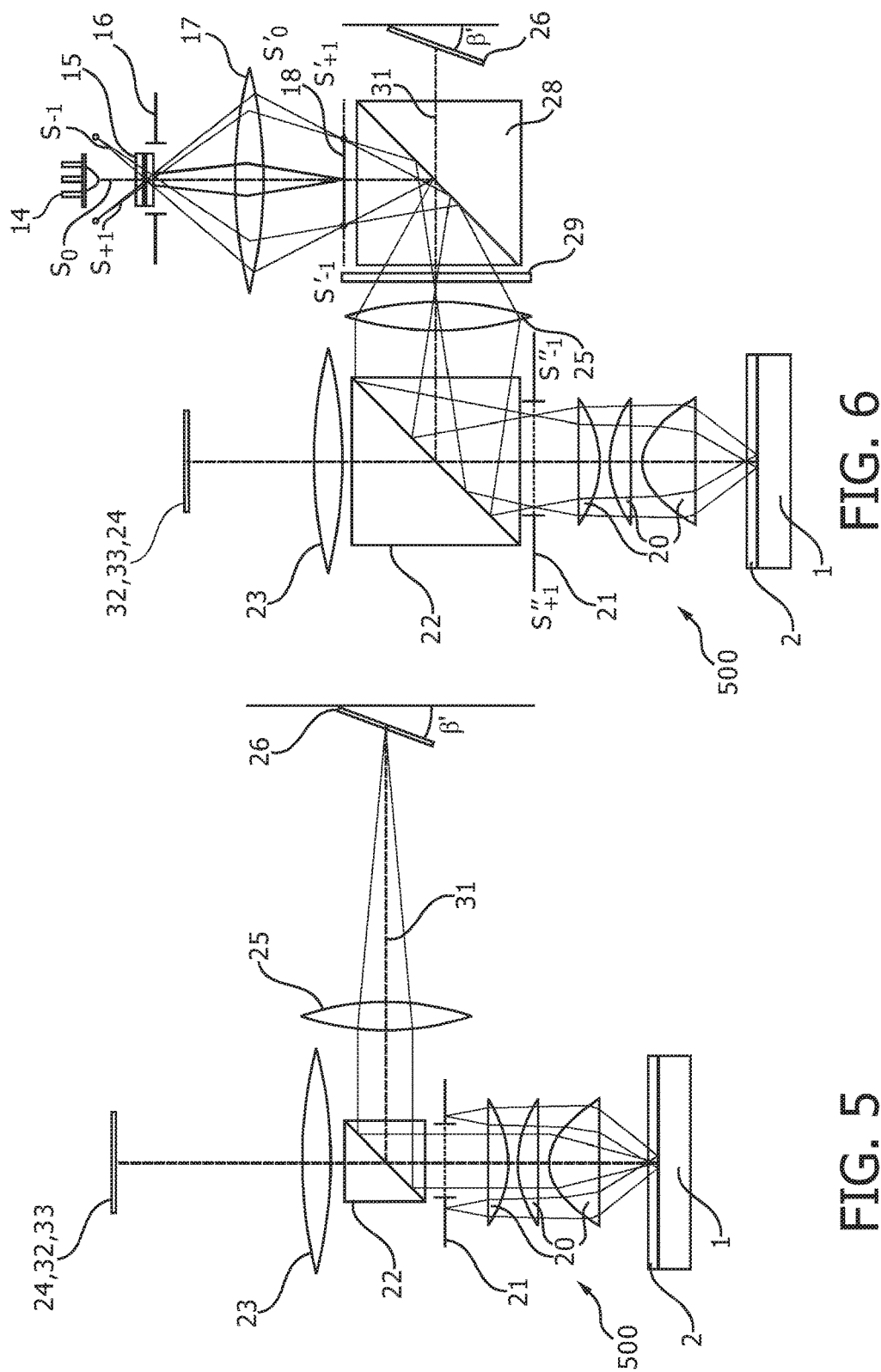

AUTOFOCUS IMAGING

CROSS REFERENCE TO RELATED APPLICATION

This application is a divisional of application Ser. No. 13/697,681, filed Nov. 13, 2012, which is a national stage entry of Application no. PCT/IB2011/051963, filed May 4, 2011 and claims the benefit of EP Application no. 10305520, filed May 18, 2010 and of EP Application no. 10305559, filed May 27, 2010.

FIELD OF THE INVENTION

The present invention relates to the field of digital pathology, notably. In particular, the present invention relates to an autofocus imaging system for a microscope, a microscope comprising an autofocus imaging system, a method for autofocus imaging of a microscope, a computer-readable medium and a program element.

BACKGROUND OF THE INVENTION

In digital pathology and particular in the case of whole slide scanning, specimens are sliced and imaged for analysis purposes as well as teaching purposes. Line sensors may be used for scanning a whole tissue slide. These slide scanners may perform a continuous mechanical scanning, thereby reducing stitching problems and allowing for the use of so-called time delay integration (TDI) line sensors in order to accommodate for low brightness of the illumination.

For focusing focus maps may be used. Before the actual scanning the optimum focus position is determined at a number of positions on the slide. This results in a "focus map". This procedure may be necessary because the axial position of the tissue layer may vary with several micrometers across the slide, as may be seen in FIG. 1. The variation of the tissue layer may thus be more than the focal depth of the microscope objective. During scanning the focus position of the objection is set on a trajectory that interpolates between the measured optimum focus settings on the selected measurement locations. This procedure may be both prone to errors and be also time-consuming, thereby limiting the throughput of the system.

WO 2005/010495 A2 describes a system and a method for generating digital images of a microscope slide, the microscope comprising a main camera and a focus camera which is tilted with respect to the optical axis.

SUMMARY OF THE INVENTION

However, the performance of the autofocus function may be insufficient.

It may be desirable to have an autofocus imaging system with improved performance.

According to a first aspect of the invention an autofocus imaging system for a microscope is provided, which comprises a primary image sensor and an autofocus image sensor. The primary image sensor is adapted for acquiring primary image data of an object of interest, such as a tissue slide. The autofocus image sensor is adapted for acquiring autofocus image data of an oblique section of the object of interest. The primary image sensor is further adapted for sampling a first number of pixels per distance in object space and the autofocus image sensor is further adapted for sampling a second number of pixels per distance in object space, wherein the second number is between one quarter and three quarters of the first number.

In other words, the autofocus image sensor samples a smaller number of pixels per distance in object space than the primary image sensor. By sampling a smaller number of pixels, the computational load and also the sampling time may be reduced. Furthermore, by sampling not less than one quarter of the pixels which are sampled by the primary image sensor the quality of the autofocus sensor signal may be optimized.

According to an exemplary embodiment the second number is half of the first number. In other words, the autofocus image sensor samples half the numbers of pixels per distance in object space in the primary image sensor.

The primary image sensor assembly may comprise one line sensor or may comprise more than one line sensor, for example three or even more line sensors. Each line sensor may detect a different wavelength or wavelength range. For example, one line sensor may detect green light, a second red light and a third line sensor may detect blue light (only).

According to another exemplary embodiment the autofocus image sensor is tilted with respect to an optical axis of radiation from the object of interest towards the autofocus image sensor, e.g. tilted with respect to an optical axis of the primary image sensor. In this way the position of the tissue layer on the sensor is a measure for the amount of defocus.

According to another exemplary embodiment the autofocus image sensor is adapted for acquiring the autofocus image data at a light frequency outside the frequency of the visible spectrum.

According to another exemplary embodiment the autofocus imaging system is adapted for dark field illumination of the autofocus image sensor.

In other words, the object of interest may be illuminated with a beam comprising a set of directions of propagation, such that the angle of these directions of propagation is larger than the angle sub-tended by the detection aperture of the autofocus imaging sensor. In this way light reflected from various surfaces (air, cover slip, cover slip-tissue layer, tissue layer-slide, slide-air) may not end up at the autofocus image sensor. In fact, all low object spatial frequencies may be blocked and only signal emanating from the tissue (which has sufficiently high spatial frequencies) may be detected at the autofocus image sensor. This may improve the robustness and accuracy that the axial position of the tissue layer can be measured.

According to a second aspect of the invention a microscope comprising an above and below described imaging system is provided.

According to an exemplary embodiment of the invention, the microscope is adapted as a slide scanner for digital pathology.

According to another aspect of the invention a method for autofocus imaging of a microscope is provided, in which primary image data of an object of interest is acquired by a primary image sensor, autofocus image data of an oblique section of the object of interest is acquired by an autofocus image sensor, a first number of pixels per distance in object space are sampled, the first number of pixels being pixels of the primary image sensor, and a second number of pixels per distance in object space is sampled, the second number of pixels being pixels of the autofocus image sensor. The second number is between one quarter and three quarters of the first number.

According to another aspect of the invention a computer-readable medium is provided, in which a computer program for autofocus imaging of a microscope is stored which, when executed by a processor of a microscope, causes the processor to carry out the above and/or below described method steps.

Furthermore, according to another aspect of the invention, a program element for autofocus imaging of a microscope is provided, which, when being executed by a processor of a microscope, causes the processor to carry out the above and/or below described method steps.

A computer-readable medium may be a floppy disk, a hard disk, a CD, a DVD, an USB (Universal Serial Bus) storage device, a RAM (Random Access Memory), a ROM (Read Only Memory) and an EPROM (Erasable Programmable Read Only Memory). A computer-readable medium may also be a data communication network, for example the Internet, which allows downloading a program code.

It may be seen as a gist of an exemplary embodiment of the present invention, that the autofocus imaging sensor, which may be a two-dimensional sensor, samples a smaller number of pixels per distance in object space and the primary sensor, which may be a line sensor or which may comprise more than one line sensors. For example, the autofocus sensor samples half the number of pixels than the primary sensor.

These and other aspects of the invention will be apparent from and elucidated with reference to the embodiments described hereinafter.

Exemplary embodiments of the present invention will now be described in the following, with respect to the following drawings.

BRIEF DESCRIPTION OF THE DRAWINGS

FIG. 5 shows a microscope with an autofocus imaging system according to an exemplary embodiment of the invention.
FIG. 6 shows a microscope with an autofocus imaging system according to another exemplary embodiment of the invention.

DETAILED DESCRIPTION OF EMBODIMENTS

Figure 1:
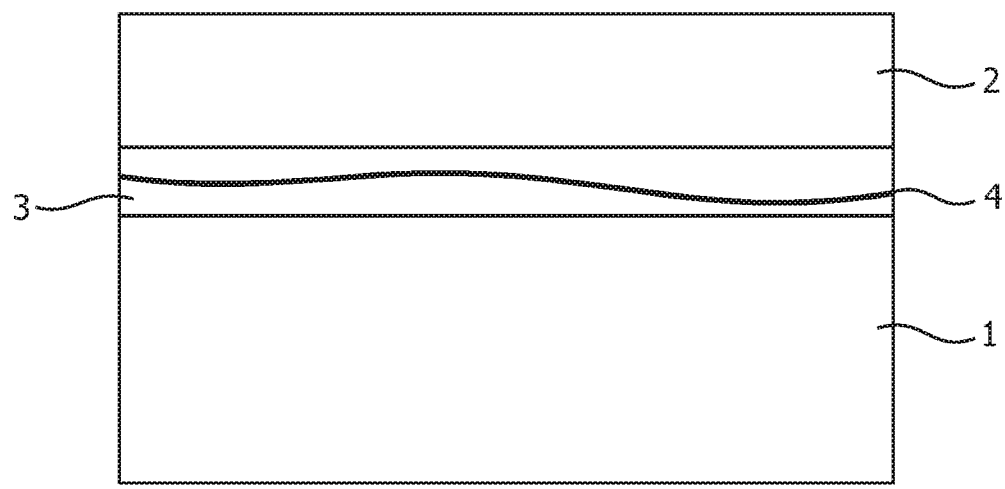
FIG. 1 shows a cross-section of a tissue slide assembly.

The illustration in the drawings is schematically. In different drawings, similar or identical elements are provided with the same reference numerals.

In the following, the character prime (') associated to a symbol will mean that the image space is considered (e.g. sensor reference) while a symbol without prime character will mean that the object space is considered (typically the sample reference). For example, when the angle Beta prime ($\beta'$) will be used in this decription, a rotation in image space, and, as will be described more specifically a rotation of the physical sensor, will be indicated. Also, an angle Beta ($\beta$ without prima) will indicate a rotation in object space, and as will be described more specifically a rotation of an oblique cross section of the sample that is imaged by the autofocus sensor.

FIG. 1 shows a schematic cross-section of a tissue slide assembly, comprising a microscope slide 1, having a typical thickness of 1 mm, a cover slip 2, with a typical thickness of 0.17 mm, a mounting medium 3 for fixing and sealing off a tissue layer 4. The tissue layer is typically around 5 µm thick, the mounting layer includes the tissue layer and is typically 10-15 µm thick. The mounting medium may be applied to the slide with tissue layer in liquid form before a cover slip is attached to the slide, subsequently the mounting liquid solidifies, thus mechanically fixing the tissue layer and sealing it off from the outside environment in order to provide stability against deterioration. The axial position of the tissue layer may vary within several µm across the slide.

For providing an optimum resolution during scanning the focus may have to be adjusted continuously, since the axial position of the tissue layer varies.

An alternative for the use of the "focus map"-method is the use of a continuous autofocus system, i.e. an additional system that continuously measures the optimum focus position and adapts the axial position of the objective lens during the actual scan for acquiring the digital image. The autofocus system may be based on optimizing the contrast in the obtained image. A variety of matrix may be used for contrast optimization. However, the sine of the focus error (above or below focus) can not be determined in this manner, i.e. the focus error signal is not polar. This may be disadvantageous for a continuous autofocus system that needs permanent updates on the optimum focus setting.

The autofocus system may use the line reflected at a reference surface at or near the object plane, such as in optical disks. However, a drawback of this method when applied to tissue slides may be that the relevant interface (between microscope slide and tissue layer and between tissue layer and cover slip) may have a low reflectance and that the reflection signal is distorted by scattering arising from the nearby tissue layer, thus comprising robustness.

Figure 2:
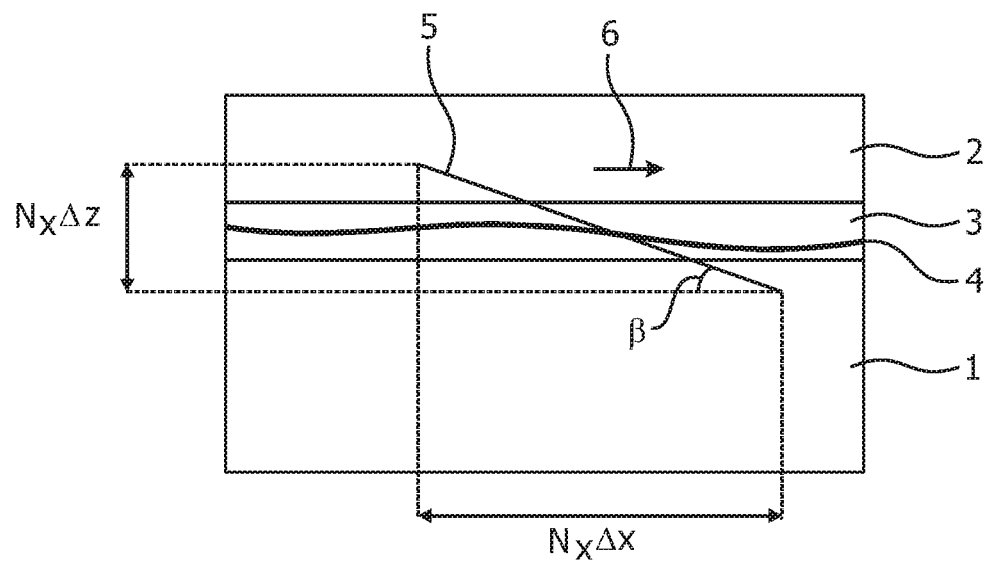
FIG. 2 shows a tilted autofocus image sensor.

A good alternative is the use of an additional sensor that is tilted with respect to the optical axis. This autofocus image sensor makes an image of an oblique section of the object, as depicted in FIG. 2. This section may cut through the tissue layer at some point depending on the axial position of the tissue layer or relative to the focal plane of the objective lens. In this way the position of the tissue layer on the sensor is a measure for the amount of defocus. For more details on these aspects, the reader may refer to the European patent application No 09306350.

As can be seen from FIG. 2 the tilted autofocus image sensor makes an image of an oblique cross-section 5 of the tissue slide assembly. The tilt is in the scanning direction 6. The sensor has $N_x$ pixels and samples the object in the scan direction with $\Delta x$ per pixel and in the axial direction with $\Delta z$ per pixel.

For example, the autofocus imaging system operates using wavelengths outside the visible spectrum so as not to spoil the white light imaging of the tissue layer. For example, the autofocus system operates using wavelengths on the infrared side of the visible spectrum, because ultraviolet radiation may damage the tissue and may require more complicated and/or expensive optical components than infrared radiation.

In an exemplary embodiment, the additional autofocus image may be provided by using a so-called dark field illumination. Hereby, the sample is illuminated with a beam comprising a set of directions of propagation, as already described above.

A problem may arise if the tilted autofocus sensor is combined with a time delay integration (TDI) line sensor (primary image sensor) for high throughput imaging. Such a TDI-line sensor records each object pixel L times, where the number of stages L can be typically up to 128. This has the effect that the total integration time, and hence signal level, increases by a factor L compared to a conventional single line sensor. This is used to increase the scanning speed of the system.

A reasonable starting point in the design of such a system may entail having a resolution $R_{af}$ of the autofocus sensor approximately equal to the resolution $R_{im}$ of the (TDI-based) image sensor in order to be able to test the same level of sharpness in the image. The novel insight of the inventors is that this implies a problem with signal level on the autofocus image sensor as will be apparent from the following considerations. Taking a linear scan speed v the line rate of the image sensor is:

$$\frac{1}{T_{im}} = \frac{2v}{R_{im}} \quad (1.1)$$

(NB: pixel size=half the resolution) making the total integration time $LT_{im}$. In order to prevent motion blur the autofocus sensor must have a shutter such that the collection time is:

$$T_{af} = \frac{R_{af}}{2v} \quad (1.2)$$

The beam after the objective lens is split in two parts by a beam splitter, a fraction η is directed towards the autofocus sensor, and a fraction 1−η towards the image sensor. If the slide is illuminated with an intensity B (incident power per area), then the signal level at the image sensor and at the autofocus image sensor are given by:

$$I_{im} = \eta_{im}(1-\eta)L\frac{B}{v}\left(\frac{R_{im}}{2}\right)^3 \quad (1.3)$$

$$I_{af} = \eta_{af}\eta\frac{B}{v}\left(\frac{R_{af}}{2}\right)^3$$

where $\eta_{im}$ is the image sensor (quantum) efficiency and $\eta_{af}$ is the autofocus sensor (quantum) efficiency. These sensor efficiencies may be assumed to be approximately equal. The ratio of the two is:

$$\frac{I_{af}}{I_{im}} = \frac{\eta_{af}}{\eta_{im}}\frac{\eta}{(1-\eta)L}\left(\frac{R_{af}}{R_{im}}\right)^3 \quad (1.4)$$

If $L_0=(1-\eta)L$ is the number of stages that would be needed if no autofocus sensor was used and taking $R_{af} \approx R_{im}$ and $\eta_{af} \approx \eta_{im}$ it follows that:

$$\frac{I_{af}}{I_{im}} \approx \frac{\eta}{L_0} \ll 1 \quad (1.5)$$

Clearly, the signal level at the autofocus sensor is much smaller than the signal level at the image sensor. As a consequence, the autofocus sensor signal will be relatively noisy, which compromises the accuracy of the focus error signal.

Figure 3:
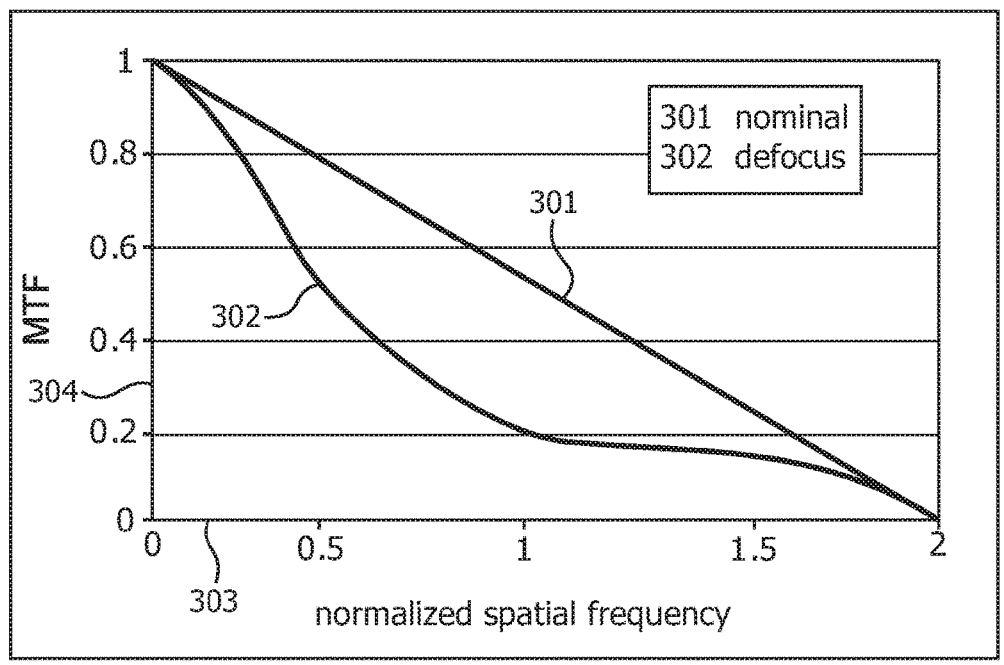
FIG. 3 shows the effect of defocus on MTF.

There may be a significant redundancy in the resolution requirements on the autofocus sensor compared to the resolution requirements on the image sensor. This insight follows from the study of the effect of defocus on the so-called Modulation Transfer Function (MTF), which is the ratio of the modulation in the image of a periodic object and the modulation in the object itself as a function of spatial frequency (the inverse of the period p). The MTF as a function of defocus for the simplified 1D-case with equal condenser and objective NA is given by:

$$MTF = sinc(2\pi\beta q(2-q))\left(1-\frac{q}{2}\right) \quad (1.6)$$

with $\sin c(x)=\sin(x)/x$, $q=\lambda/pNA$ is the normalized spatial frequency, and $\beta=\Delta z NA^2/2n\lambda$ is a defocus parameter. FIG. 3 shows the MTF for the nominal in-focus situation 301 and for a case with defocus 302. The x-axis 303 depicts the normalized spatial frequency and the y-axis 304 depicts the MTF values.

Figure 4:
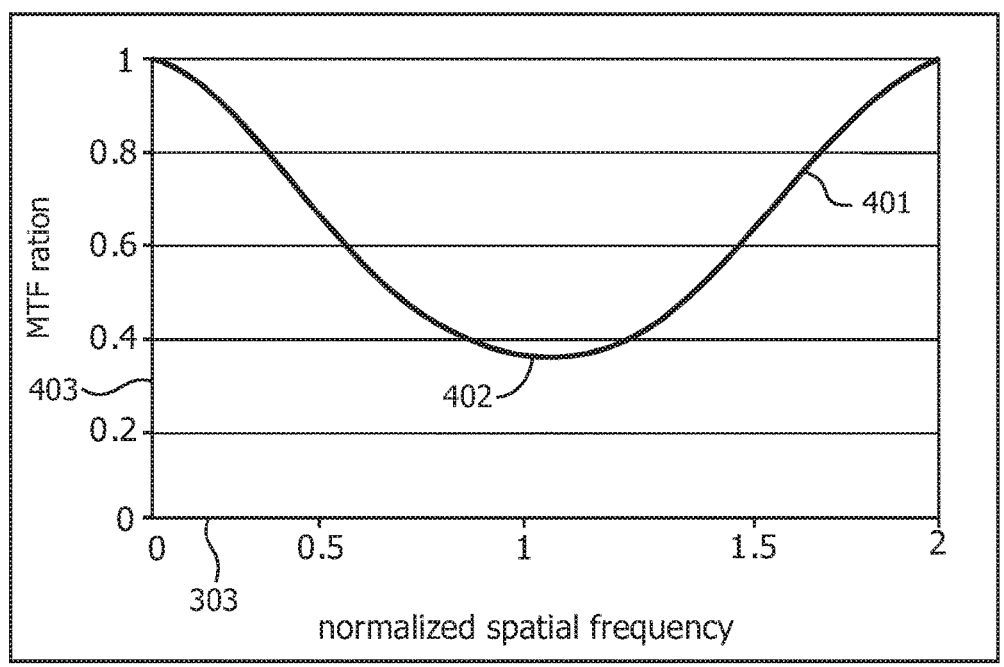
FIG. 4 shows the ratio of defocus MTF to zero defocus MTF.

FIG. 4 shows the ratio 401 of the two MTF-functions 301, 302. The y-axis 403 depicts the MTF ratio; a minimum 402 can be observed the x value equal to 1. Both MTF-functions show a cut-off at $2NA/\lambda$, (this is the so-called 'diffraction limit'), which is the ultimate resolution limit for a conventional microscope. The ratio of the two MTF-functions shows a dip for the middle spatial frequencies. From this analysis we may conclude that:

The resolution of the primary image sensor is preferably determined by the so-called Nyquist-criterion for the $2NA/\lambda$ spatial frequency cut-off to $R_{im}=\lambda/2NA$ (so pixel size $M_{im}\lambda/4NA$, with $M_{im}$ the magnification from object to image sensor).

The resolution of the autofocus sensor is preferably determined by the maximum in defocus sensitivity to half the spatial frequency cut-off to $R_{im}=\lambda/NA$ (so pixel size $M_{af}\lambda/2NA$, with $M_{af}$ the magnification from object to autofocus sensor).

According to an exemplary embodiment the autofocus image sensor sampling (pixels/m in object space) is selected ¾ to ¼ or, e.g., at least a factor two smaller than the image sensor sampling. This gives a good compromise between defocus sensitivity and autofocus to image signal ratio. Preferably, the beam splitter fraction η is adapted such that the autofocus sensor signal is sufficiently high compared to the image sensor signal. Preferably, the parameter settings are such that the TDI-based line sensor has sufficient redundancy to maintain a sufficiently high image sensor signal, i.e. $\eta>1-L_0/L_{max}$, where $L_{max}$ is the maximum number of TDI-stages.

This is different from the implementation of a secondary camera autofocus method based on the addition of a dedicated image sensor for autofocus, which is not tilted with respect to the plane in the object that is being imaged, and where the difference in resolution (specifically a lower resolution of the autofocus sensor) serves the sole purpose of increasing the speed of the autofocus sensor with respect to the primary image capturing sensor. Also the reduction in pixel count is described for several embodiments as a factor of at least 3, and a factor of at least 10. As is seen in the minimum in the bottom graph of FIG. 3, the inventors specifically found an optimum at a reduction in the resolution of exactly 2,. Although a practical range for a second embodiment would be a range between 4/3 and a factor 4.

The depth range $\Delta z_{tot}$ of the autofocus system must be sufficiently large for realistic settings of other parameters. The autofocus image sensor has $N_x$ pixels in the scan direction, with pixel size b. The sensor is tilted over an angle β' so that the lateral and axial sampling is given by:

$\Delta x' = b \cos \beta'$ $\Delta z' = b \sin \beta'$

The lateral and axial sampling at the object (the tissue slide) is given by:

$\Delta x = \Delta x'/M$ $\Delta z = n\Delta z'/M^2$ where M is the magnification and n the refractive index of the object. The axial sampling at the object now follows as:

$$\Delta z = \frac{n\Delta z'}{(\Delta x'/\Delta x)^2} = \frac{\sin\beta'}{\cos^2\beta'}\frac{n\Delta x^2}{b}$$

As there are $N_x$ pixels the total depth range is:

$$\Delta z_{tot} = N_x \Delta z = \frac{\sin\beta'}{\cos^2\beta'}\frac{N_x n\Delta x^2}{b}$$

Table 1 shows an example of parameter settings according to the invention. In this example the autofocus resolution is 2×0.9 μm, whereas the image resolution is preferably about 2×0.25 μm (taking a 20×/NA0.75 microscope objective).

As a non limitative example, FIG. 5 shows part of a microscope and in particular the imaging branch of the light path. An embodiment for epi-mode dark field illumination is shown in FIG. 6.

The light passing through the slide 1 and the cover slip 2 (and tissue layer 4, not shown) is captured by the objective lens 20 with the back aperture 21, wherein the unscattered beams are blocked. A colour splitter 22 splits off the white light which is imaged by a tube lens 23 onto the image sensor arrangement, which may comprise a first, a second and a third primary image sensor 24, 32, 33, which may be adapted in the form of line sensors, 24 for generating the digital tissue image. The infrared light is imaged by a second tube lens 25 onto the autofocus image sensor 26, which is tilted with respect to the optical axis 31 of radiation from the object of interest towards the autofocus image sensor 26. In the context of this disclosure "tilted with respect to the optical axis of the primary image sensor" means that the radiation from the object of interest which impinges on the autofocus image sensor does not impinge on the autofocus image sensor perpendicularly. However, the radiation which travels from the object of interest towards the primary image sensor may impinge perpendicularly on the primary image sensor, although this is not required already described herein above. Rays scattered by the tissue can pass through the aperture 21 and are imaged onto the autofocus image sensor 26.

FIG. 6 shows an optical layout for epi-mode dark field illumination of a microscope with an autofocus imaging system 500 having a laser diode 14, the illumination being integrated with the imaging branch. Two crossed gratings 15 are arranged after the laser diode 14 for generating diffraction orders, for example a 0th diffraction order S'$_0$, a+1$^{st}$ order S'$_{+1}$ and a −1$^{st}$ order S'$_{-1}$. Still further, a field stop 16 is arranged close to the gratings 15 for limiting the width of the dark field illumination beams, and a collimator lens 17 the collimates the light from the laser diode 14.

A polarizing beam splitter 28 is provided to split the beam after it has passed the collimator lens 17. Furthermore, the microscope comprises quarter-wave plate 29. Both elements 28 and 29 take care of directing the beam originating from the laser towards the objective lens and erecting the scattered light originating from the tissue towards the autofocus image sensor.

Figure 7:
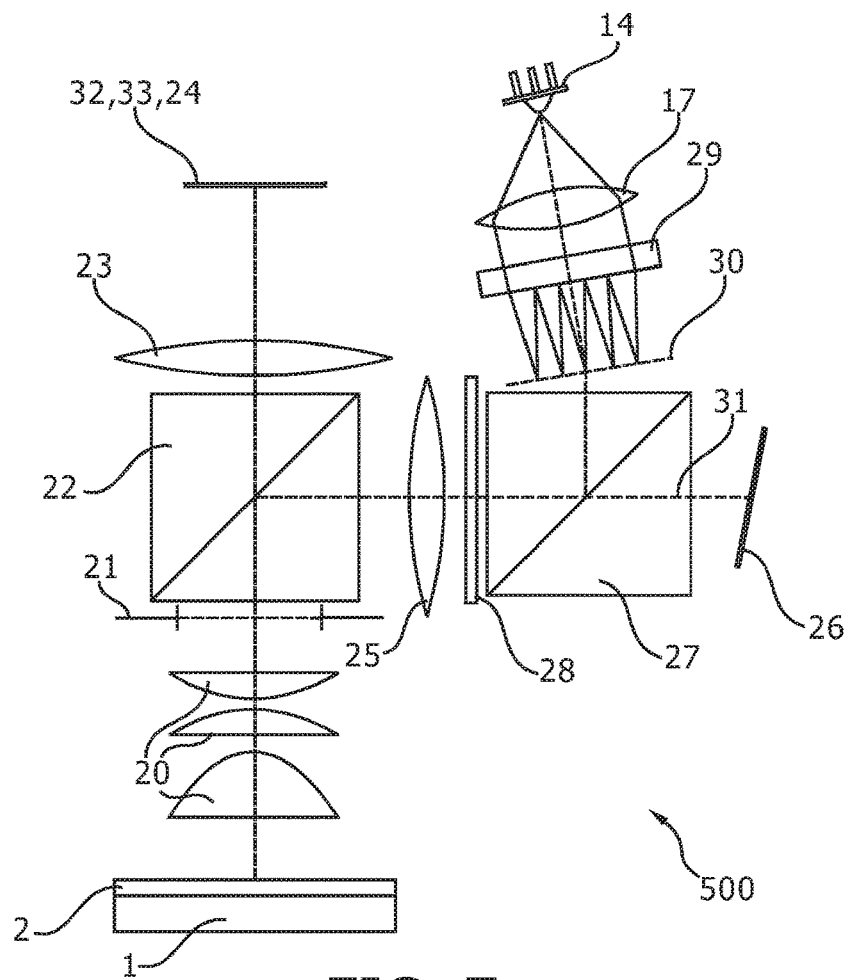
FIG. 7 shows a microscope with an autofocus imaging system according to another exemplary embodiment of the invention.

FIG. 7 shows an optical layout for multi-spot illumination of a microscope 500, which illumination is integrated with the imaging branch. The lens 17 collimates the beam which is incident on a spot generator for generating an array of spots 30. By tilting the whole assembly, the spot array can be tilted so that the resulting incident spot array and the slide is tilted as well. The spot generator 29 generates an array of low-NA beams, which can pass the beam splitter 27 without introducing significant aberrations.

In the embodiment of FIG. 7 an array of spots is used to illuminate the oblique section 5 that is imaged by the autofocus image sensor. The spots that are focused on the tissue may experience time-dependent scattering as the absorption and refractive index of the region into which the spot is focused changes with scanning. By examining the time-dependence of the spots imaged on the autofocus image sensor the axial position of a tissue layer may be located. Namely, close to focus the high resolution information is visible, away from focus this is blurred. As a consequence, the signal variations on a comparatively small time scale may be maximum when the tissue layer coincides with the focal plane.

Figure 8:
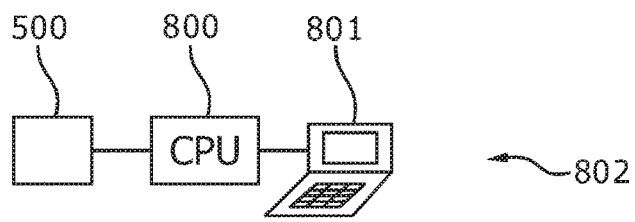
FIG. 8 shows a microscope system according to an exemplary embodiment of the invention.

FIG. 8 shows a microscope system 802 comprising a microscope with an autofocus imaging system 500 connected to a processor or processing unit 800 which is connected to a user interface 801, such as a computer.

Figure 9:
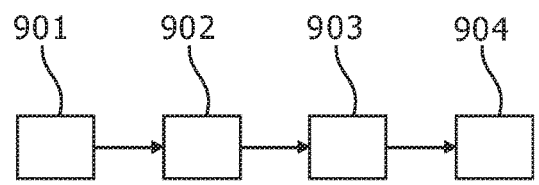
FIG. 9 shows a flow-chart of a method according to an exemplary embodiment of the invention.

FIG. 9 shows a flow-chart of a method according to an exemplary embodiment. In step 901 primary and secondary, i.e. autofocus image data of an object of interest are acquired by a primary image sensor and an autofocus image sensor, respectively. In step 902 the pixels of the primary image sensor are sampled. In step 903 (which can be before, after or at the same time as step 902) a certain number of pixels per distance in object space of the autofocus image sensor is sampled. This number is smaller than the sampled number of pixels of the primary image sensor. Then, in step 904, the focus of the microscope is adjusted based on the sampling.

Thus, the focus of the primary image sensor may be adjusted automatically.

In another embodiment of the invention, the principles of the present invention may be advantageously applied to a sensor which the applicant of the present invention has already proposed under European patent application No 09306350, and which is hereby incorporated by reference.

As a result, according to this embodiment the primary image sensor and the autofocus image sensor may share a same sensing area. In other words, the primary image sensor and the autofocus image sensor may together form a unique sensor with a sensing area (typically formed of pixels) that is both used for autofocus and for image acquisition.

According to this embodiment, the larger autofocus pixels may be either actual physical pixels located next to or intermixed in the array or arrays of primary image pixels, or the autofocus pixels may be virtual pixels obtained by combining two or more of the primary image pixels into a larger virtual autofocus pixel. Such a combination may be done on the sensor itself, or in a separate processing unit.

The described autofocus system finds application in digital pathology and other fields of rapid micro scanning.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

TABLE 1

Example of parameter settings.

| | | |
|---|---|---|
| sensor pixel size (μm) | 10.0 | given numbers |
| #pixels x (scan) direction | 640 | |
| #pixels y direction | 480 | |
| sensor tilt angle (deg) | 12.0 | |
| tube lens focal length (mm) | 100.0 | |
| objective lens magnification | 20 | |
| reference tube focal length (mm) | 180 | |
| refractive index slide | 1.50 | |
| lateral magnification | 11.1 | calculated numbers |
| axial magnification | 82.3 | |
| sampling x (scan) direction (μm) | 0.88 | |
| sampling y direction (μm) | 0.90 | |
| sampling z (axial) direction (μm) | 0.025 | |
| field x-direction (mm) | 0.563 | |
| field y-direction (mm) | 0.432 | |
| axial (z) range (μm) | 16.2 | |

LIST OF REFERENCE SIGNS 1 microscope slide
2 cover slip
3 mounting medium
4 tissue layer
5 oblique cross-section
6 scanning direction
14 laser diode
15 two crossed gratings
16 field stop
17 collimator lens
18 stop for blocking 0th order light rays
20 objective lenses
21 back aperture
22 colour splitter
23 tube lens
24 first primary image sensor
25 tube lens
26 autofocus image sensor
28 beam splitter
29 quarter-wave plate
31 optical axis
32 second primary image sensor
33 third primary image sensor
301 MTF for nominal in-focus situation
302 MTF for defocus situation
303 x-axis (normalized spatial frequency)
304 y-axis (MTF)
401 ratio of the MTF functions 301, 302
402 minimum
403 y-axis (ratio of the MTF functions 301, 302)
500 autofocus imaging system
800 processor
801 user interface
802 microscope system
901 method step
902 method step
903 method step
904 method step

The invention claimed is:

1. Autofocus imaging system for a microscope, the autofocus imaging system comprising:
a single sensor for acquiring primary image data of an object of interest and for acquiring autofocus image data of an oblique section of the object of interest;
wherein the primary image data is sampled with a first number of pixels per distance in object space;
wherein the autofocus image data is sampled with a second number of pixels per distance in object space;
wherein the second number is between one quarter and three quarters of the first number.

2. The autofocus imaging system of claim 1,
wherein the second number is half of the first number.

3. The autofocus imaging system of claim 1,
wherein a resolution of the primary image data is λ(wavelenath)/(2NA(numerical aperture)); and
wherein a resolution of the autofocus image data is λ/(NA).

4. The autofocus imaging system of claim 1,
wherein the autofocus image data is sampled along a tilt with respect to an optical axis (31) of the single sensor (24).

5. The autofocus imaging system of claim 1,
wherein the autofocus image data is sampled along a tilt in a scan direction (6) of the single sensor.

6. The autofocus imaging system of claim 1, further comprising:
a beam splitter for splitting a beam from the object into a first beam comprising the primary image data and a second beam comprising the autofocus image data;
wherein a fraction between an intensity of the second beam and an intensity of the first beam is greater than $(1-L_0/L_{max})$, wherein $L_0=(1-\eta$(sensor quantum efficiency of the single sensor))L(number of stages of the single sensor) and $L_{max}$ is a maximum number of Time Delay Integration stages of the single sensor.

7. The autofocus imaging system of claim 1,
wherein the autofocus image data is samped at a light frequency outside of the visible spectrum.

8. The autofocus imaging system of claim 1,
wherein the autofocus image data is a dark field illumination of the single sensor.

9. The autofocus imaging system of claim 1,
wherein the first number of pixels sampled is comprised of light of different wavelengths.

10. The autofocus imaging system of claim 1,
wherein the single sensor comprises a line sensor and a two-dimensional sensor.

11. The autofocus imaging system of claim 1, wherein the single sensor has a same sensing area for primary and autofocus images.

12. The autofocus imaging system of claim 1, wherein the single sensor comprises a time delay integration (TDI) based line sensor.

13. The autofocus imaging system of claim 1, wherein the single sensor comprises a sensing area of autofocus pixels that are actual physical pixels located next to or intermixed in an array or arrays of primary image pixels, or are virtual pixels obtained by combining two or more of the primary image pixels into a larger virtual autofocus pixel.

14. A microscope comprising the autofocus imaging system of claim 1.

15. A method for autofocus imaging of a microscope, the method comprising the following steps:
  acquiring primary image data of an object of interest by an image sensor comprising a primary image sensor arrangement;
  acquiring autofocus image data of an oblique section of the object of interest by the image sensor;
  sampling a first number of pixels per distance in object space, the first number of pixels being pixels of a primary image data;
  sampling a second number of pixels per distance in object space, the second number of pixels being pixels of an autofocus image data;
  wherein the second number is between one quarter and three quarters of the first number.

16. A non-transitory computer-readable medium, in which a computer program for autofocus imaging of a microscope is stored which, when executed by a processor of the microscope, causes the processor to carry out the steps of:
  acquiring primary image data of an object of interest from an image sensor comprising a primary image sensor arrangement;
  acquiring autofocus image data of an oblique section of the object of interest from the image sensor;
  sampling a first number of pixels per distance in object space, the first number of pixels being pixels of the primary image data;
  sampling a second number of pixels per distance in object space, the second number of pixels being pixels of the autofocus image data;
  wherein the second number is between one quarter and three quarters of the first number.

* * * * *